Feb. 10, 1959
A. M. GRASS
2,872,842
FILM HOLDING DEVICE FOR CAMERAS
Original Filed April 1, 1952
2 Sheets-Sheet 1
Fig. 1
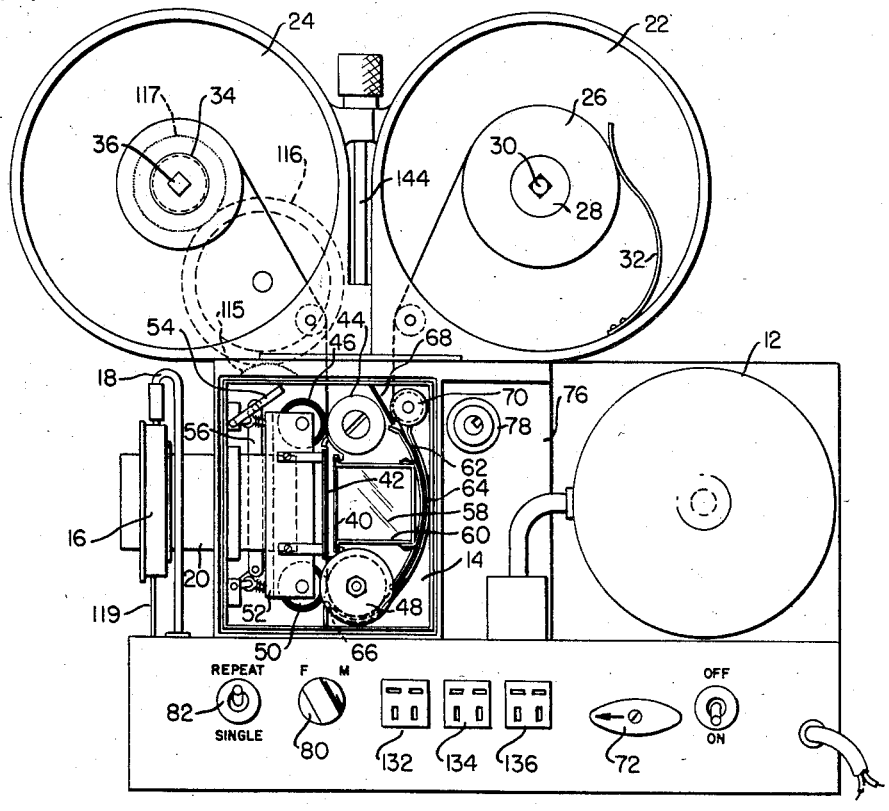
Fig. 2
INVENTOR.
ALBERT M. GRASS
BY
ATTORNEYS Feb. 10, 1959 A. M. GRASS 2,872,842
FILM HOLDING DEVICE FOR CAMERAS
Original Filed April 1, 1952 2 Sheets-Sheet 2

INVENTOR.
ALBERT M. GRASS
BY
ATTORNEYS

United States Patent Office 2,872,842
Patented Feb. 10, 1959

2,872,842
FILM HOLDING DEVICE FOR CAMERAS
Albert M. Grass, Quincy, Mass.

Original application April 1, 1952, Serial No. 279,761, now Patent No. 2,754,721, dated July 17, 1956. Divided and this application April 2, 1956, Serial No. 575,496

1 Claim. (Cl. 88—17)

The present invention relates to cameras, and more particularly to cameras for making photographs under a wide variety of selected conditions, as in the photography of scientific phenomena, the recording of cathode ray traces, the photography of phenomena at precisely timed intervals, and the like. This application is a division of my copending application Serial No. 279,761, filed April 1, 1952, now Patent No. 2,754,721, dated July 17, 1956.

The principal object of the present invention is to provide a film-holding device or magazine for a camera of the general type described in my above-mentioned application, having provision for simple and ready transfer of magazines, and for simple threading of film into the camera.

With the foregoing and other objects in view, as will hereinafter appear, the present invention comprises the camera equipment hereinafter described and particularly defined in the claims.

Figure 3:
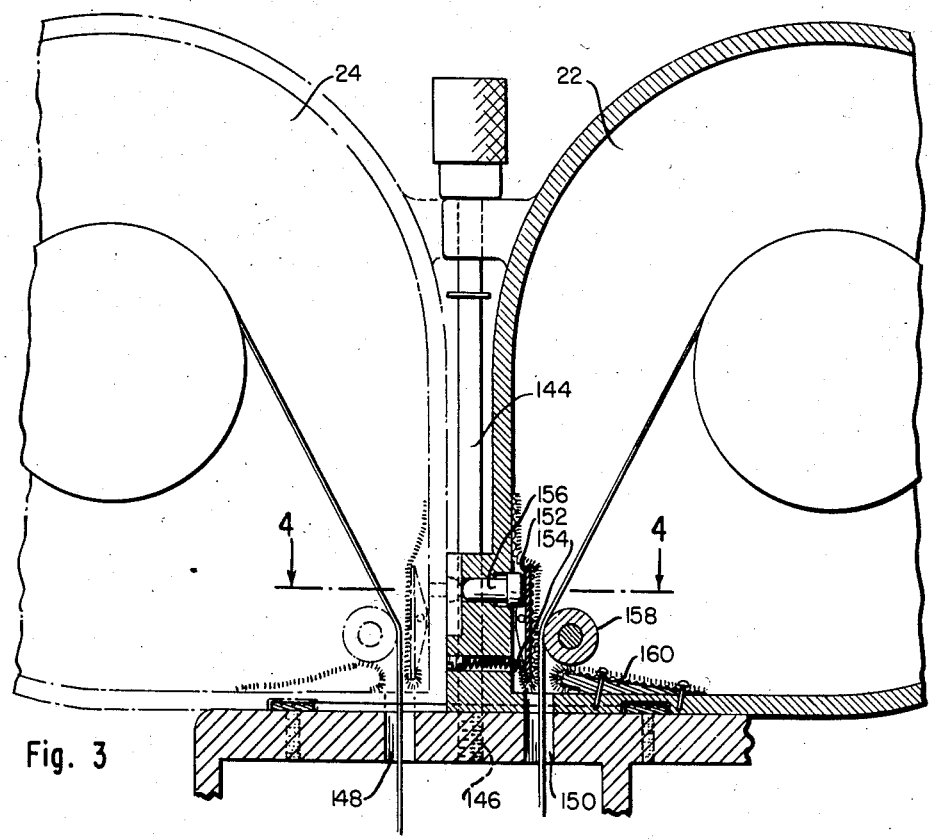
Figure 4:
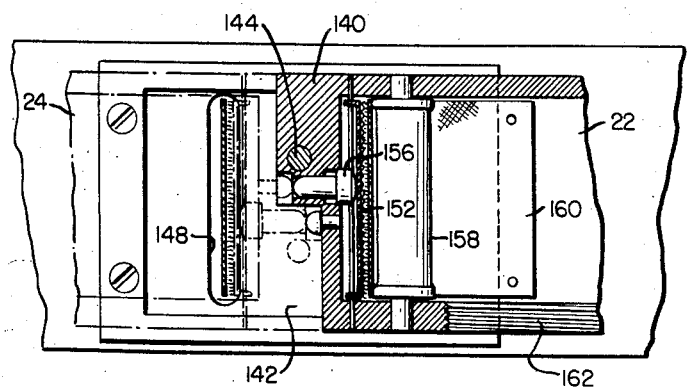

In the accompanying drawings, Fig. 1 is a side elevation of the preferred form of camera; Fig. 2 is a detail of the feed roller; Fig. 3 is a sectional elevation of the magazines, and Fig. 4 is a section on line 4—4 of Fig. 3.

The apparatus shown in Fig. 1 comprises a base 10 within which is received the control equipment to be later described, and on which is mounted a drive motor 12. At the front of the base is mounted the camera proper which comprises the exposure compartment 14 and the lens and shutter assembly 16. The shutter is preferably of the self cocking type and is provided with internal contacts (not shown) similar to those used for flash synchronization and adapted to be closed when the shutter blades are wide open and to open immediately before the blades start to close. A cable 18 leads from the shutter contacts to the control circuits in a manner to be later described. The shutter and lens assembly is mounted on a tube 20 which may be slid back and forth slightly with respect to the exposure chamber for purposes of focusing.

Two magazines 22 and 24 are provided. The supply of sensitized material such as film or paper shown at 26 is contained within the supply magazine 22. The supply is mounted on a core 28 which is supported on a central shaft 30 with only sufficient friction to permit orderly unrolling of the film without coiling. Alternatively, a spring brake 32 may bear directly against the sensitized material itself, whereby the braking action decreases as the size of the roll decreases thereby more correctly relating the braking action to the inertia of the roll.

The magazine 24 is a take-up magazine having a core 34 to which the film is connected in any suitable manner. The core 34 is mounted on a shaft 36 which is driven through a friction clutch at a speed suitable for take-up in a manner to be described presently.

The length of film between the magazines runs through the magazine 22 in a manner described in said patent, and loops through the exposure chamber and thence to the take-up magazine 24.

Within the exposure chamber there is a fixed gate 40 and a movable gate 42 between which the film is guided during exposure. Above the gates is a drive roller 44 which engages the back of the sensitized material, that is, the shiny side of the film or the base of the paper and presses it against a rubber covered roll 46. In order to permit use of unperforated film or paper, the roller 44 firmly engages the sensitized material and is therefore preferably formed with sharp longitudinal teeth in the manner of a spur gear as shown in Fig. 2, the teeth being indicated at 47. These engages the sensitized material with sufficient firmness to insure precise transport, but they do not mar the surface.

Control roller 48 similar to the roller 44 is provided below the gates and is adapted to engage the film between it and a rubber covered roller 50, which is similar to the roller 46. While the roller 44 is used to drive the film, the roller 48 is driven by the film and is itself used to control various operations to be presently described.

The movable gate 42 and the rollers 46 and 50 are mounted on a laterally movable carriage 52 which is operated by a lever 54 through suitable linkage 56 to move the gate and rubber rollers to the left and thereby permit insertion of the film.

A 45-degree mirror 58 is mounted in back of the film gate 40 and is arranged to permit the rear of the film to be observed from the side of the apparatus for focusing and for other purposes as will be later described. The mirror is contained in a frame 60 and in back of the frame is a curved guide plate 62 over which the film passes. A second guide plate 64 is spaced from the guide 62 and it runs under the roller 48 to terminate in an upwardly directed portion 66. The space between the guides 62 and 64 forms a trough to permit threading of the film into the camera. Entering the film into the trough is facilitated by an inclined guide plate 68 and a spool 70 at the upper part of the exposure chamber.

To thread the film the end of the film protruding from the supply magazine 22 is threaded into the trough between the guides 62 and 64 and is pushed until its end appears above the portion 66 of the outer guard. At this time the carriage 52 will be at the left, thereby affording substantial space between the toothed rollers 44 and 48 and their respective rubber rollers 46 and 50. A vertical plate may then be inserted against the part 66 of the guide plate, and upon further advance of the film the end of the film will slide along the vertical plate to enter the take-up magazine 24. The end of the film is then attached to the core 34 and the threading is completed, the vertical guide plate being then removed. The carriage 52 is then restored to its position whereby the film is closely maintained between the two gates 40 and 42. A cover is provided for the exposure chamber and the cover has a dark slide by which the rear of the film may be viewed in the mirror 58; focusing is done by adjusting the lens and shutter assembly until a clearly focused view is observed in the mirror. After the camera is threaded, the focusing operation admits light only to a single frame and hence only the frame which is in position when the focusing operation is being carried on is wasted.

The motor may be driven at a number of speeds controlled by a switch 72 on the base; preferably three speeds are provided. The motor is connected through gears 74 with a change speed mechanism 76, which may be of any suitable form. For the purposes of this description, it is sufficient to state that the operation of the gear box is controlled by a sliding sleeve 78. The gear box, whatever its construction, is preferably designed for a decade operation whereby the speed may be controlled in jumps of 10. It has been found for most convenient operation, the maximum film speed obtainable from the motor at full speed is one meter per second. The gear box preferably reduces the speed in the ratios $1/10$, $1/100$ and $1/1000$ whereby speeds of $1/10$ meter, 1 cm. and 1 mm. per second may be obtained. The switch 72 preferably controls operation of the motor at half and quarter speeds, so that a still finer selection is obtainable. It will be seen, therefore, that the film speed is variable in relatively small steps from .25 mm. to 1 meter per second.

On the panel there is mounted a switch 80 by which the operator may selectively determine continuous motion or framed motion of the film. A manual switch 82 is used to initiate the operation.

The electrical connections and the camera operations are fully described in my above-mentioned patent.

The details of the magazines are shown in Figs. 3 and 4; the supply magazine 22 has a boss 140, and the take-up magazine 24 has a boss 142, both arranged to fit together as shown in Fig. 4. Each boss carries a long screw shown at 144 for the supply magazine, and adapted to be threaded into the top of the frame as indicated at 146. The magazines fit tightly on top of the frame and connect with slots 148 and 150 therein.

The magazines are provided with light traps, which for the supply magazine 22 comprises a fur covered plate 152 suitably pivoted on the magazine proper and urged into closed position by a spring 154. A pin 156 engages the upper end of the plate. The film passes over a roll 158 near the mouth of the magazine and also passes adjacent to a stationary fur covered plate 160. When the magazine is removed from the frame the spring 154 urges the plate 152 against the stationary part 160 and also against the roller 158, thereby preventing access of light to the interior of the magazine. Upon attachment of the magazines, however, the pin 156 is engaged by a part of the other magazine 24 and presses on the plate 152 in a manner to open the light trap as shown in Fig. 3. Similarly, a corresponding pin for the magazine 24 engages the magazine 22 and opens the light trap of the magazine 24. The magazines are provided with threaded covers to be received in the threaded openings shown at 162 for the supply magazine, although the covers are not shown in the drawings.

All parts of the drive should be such as to withstand the rapid accelerations in film transport. The gears of the gear mechanism 76 are preferably of tough plastic such as nylon. The take-up core 34 is necessarily driven at a higher speed than the roll 44 and hence is driven through a suitable friction clutch mechanism which preferably comprises nylon members, since they have been found to give substantially the same running friction as starting friction.

Having thus described the invention, I claim:

In a camera, a supply magazine, a take-up magazine, a frame on which the magazines may be mounted, each magazine having a pivoted light trap, a spring for each light trap normally urging it toward closed position, and pins carried by the magazines, each engaging its light trap at the end opposite the spring and operated by engagement with the other magazine to open its light trap when the magazines are positioned on the frame.

References Cited in the file of this patent

UNITED STATES PATENTS

| | | |
|---|---|---|
| 1,087,996 | Tessier | Feb. 24, 1914 |
| 1,707,767 | Ponting et al. | Apr. 2, 1929 |
| 1,878,693 | Gamble | Sept. 20, 1932 |

FOREIGN PATENTS

| | | |
|---|---|---|
| 83,888 | Switzerland | Feb. 2, 1920 |